United States Patent [19]
Fukuoka

[11] 3,961,165
[45] June 1, 1976

[54] IMAGE INFORMATION TRANSFER DEVICE

[75] Inventor: Kenji Fukuoka, Tokyo, Japan

[73] Assignee: Olympus optical Co., Ltd., Tokyo, Japan

[22] Filed: June 20, 1974

[21] Appl. No.: 481,400

[30] Foreign Application Priority Data
June 21, 1973 Japan .................................. 48-69145

[52] U.S. Cl. ........................ 235/92 SH; 178/6.6 TC; 178/6; 235/92 V
[51] Int. Cl.$^2$ ........................................... H04N 1/02
[58] Field of Search ....... 235/92 SH, 92 CC, 92 PL, 235/92 V; 178/6.6 TC; 358/8; 360/36

[56] References Cited
UNITED STATES PATENTS
3,209,330  9/1965  Bonomo ........................... 235/92 SH Primary Examiner—George G. Stellar
Attorney, Agent, or Firm—Haseltine, Lake & Waters

[57] ABSTRACT

An image informaton transfer device which is applicable to an image information transmission apparatus which makes use of a motor driven scanning element and is liable to be subjected to jitter by variation in speed of the motor. The device comprises a first shift register, a second shift register and a control part, whereby an information required to be transferred is stored between the most significant digit and the least significant digit without forming any vacancy therebetween.

3 Claims, 14 Drawing Figures

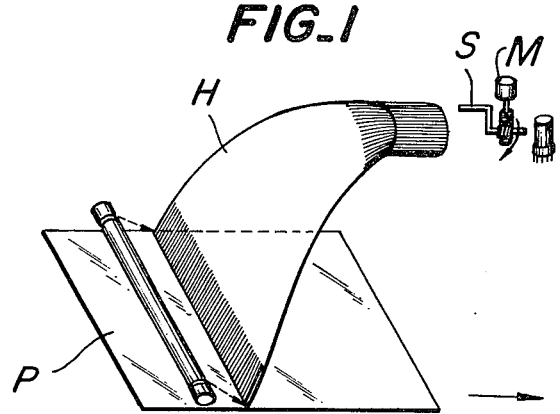
FIG_1
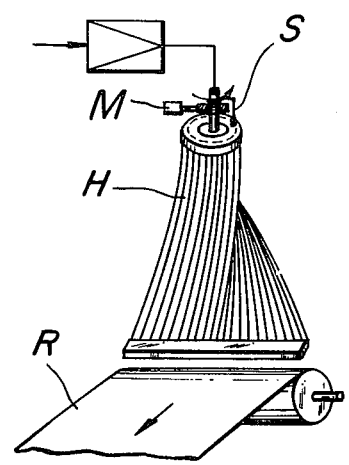
FIG_2
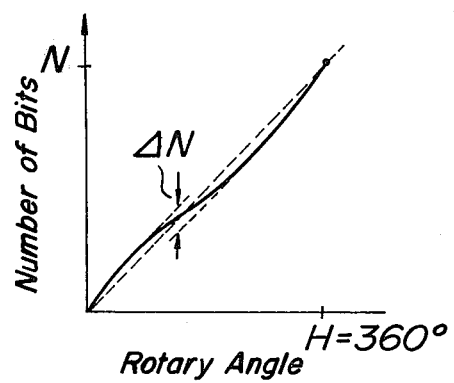
FIG_3

FIG_4
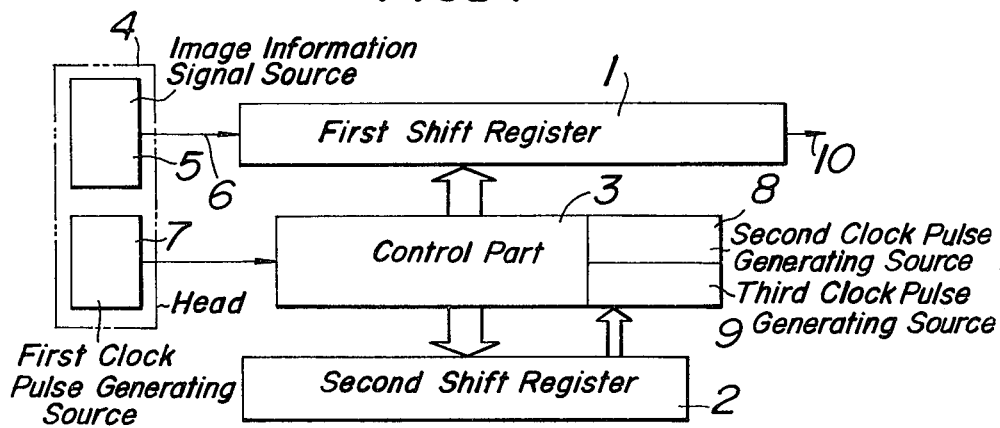
FIG_5
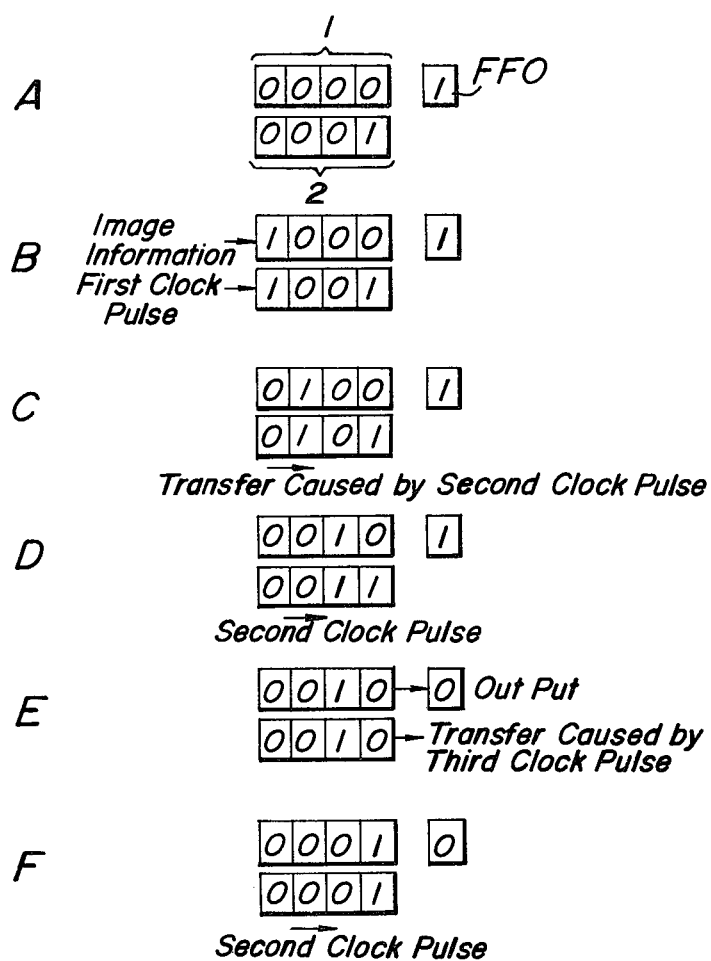

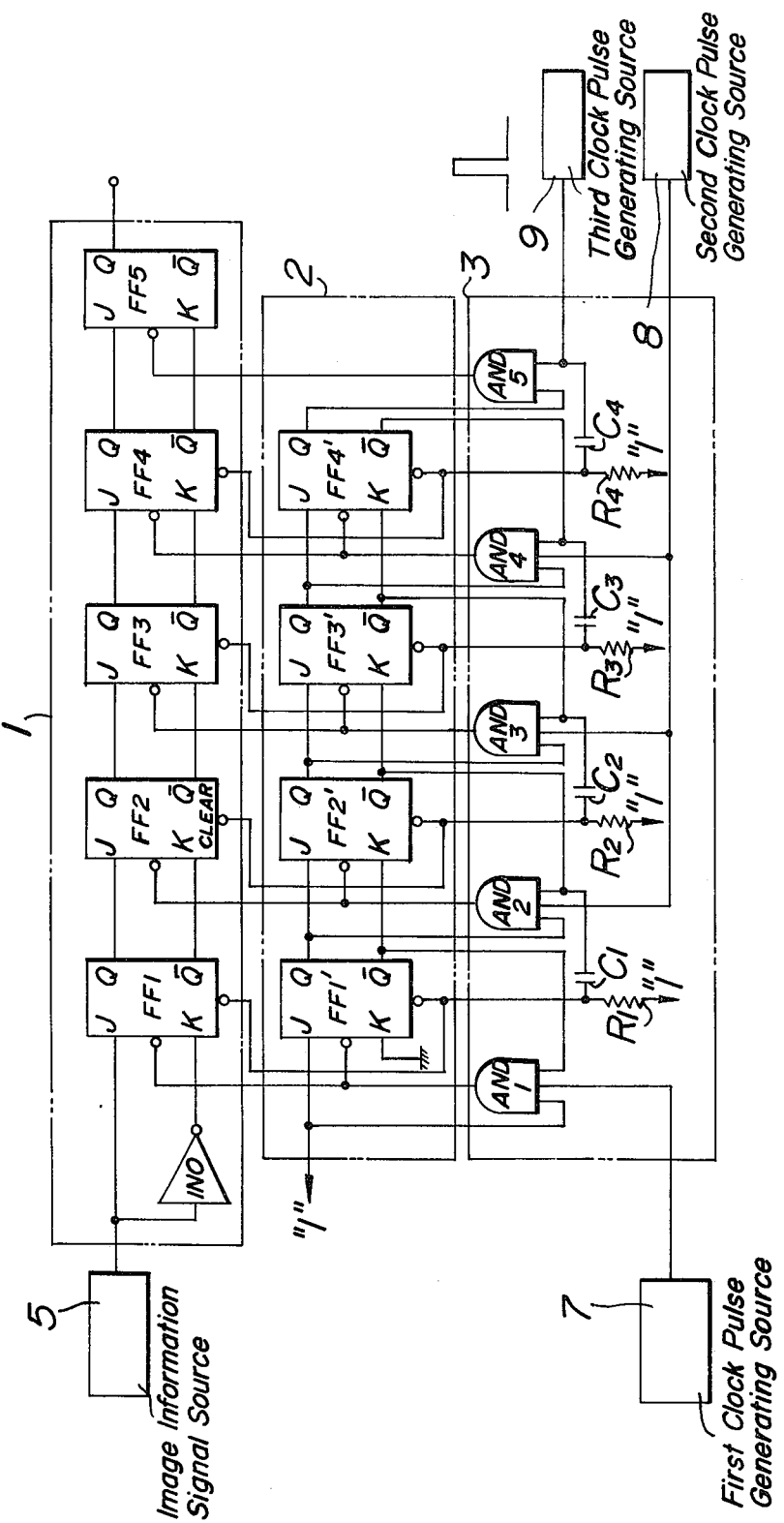
FIG_6

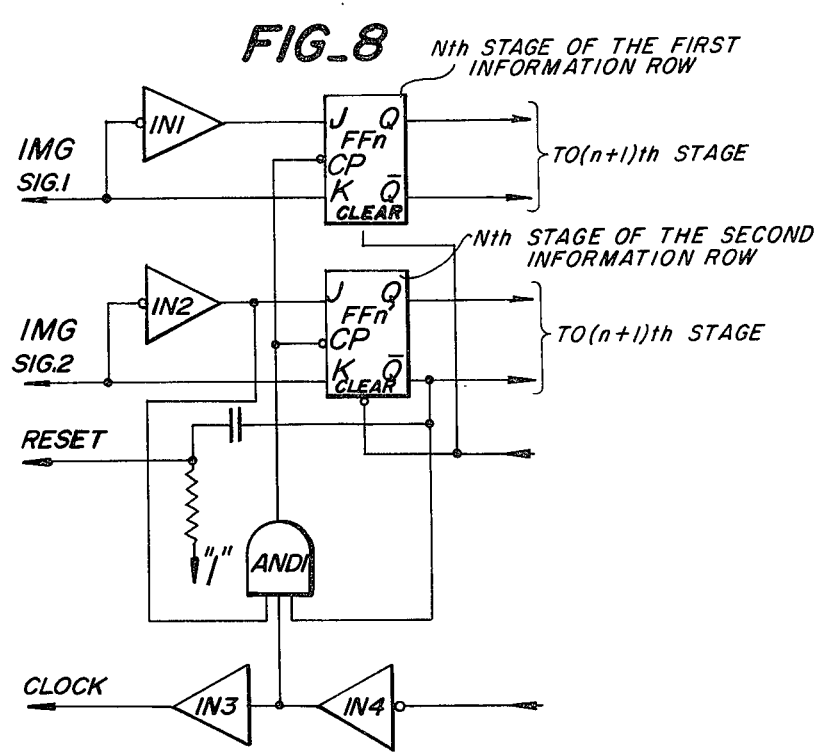
FIG_8
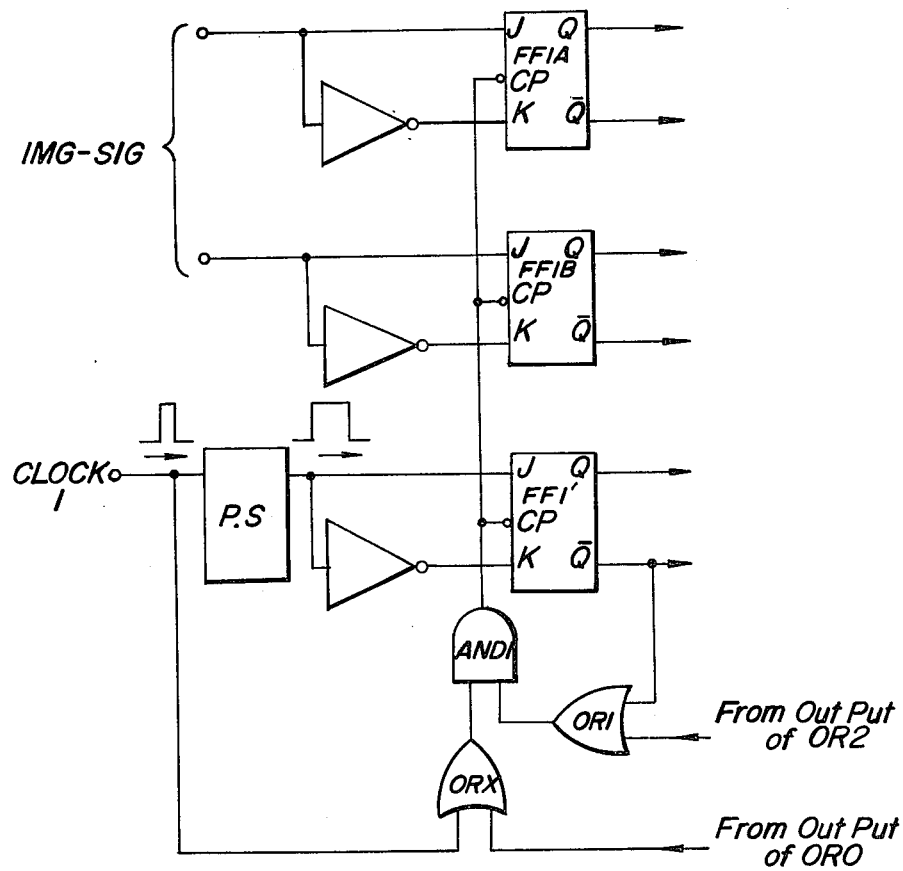
FIG_9

IMAGE INFORMATION TRANSFER DEVICE

FIELD OF THE INVENTION

This invention relates to image information transfer devices and more particularly to an image information transfer device which is applicable to an image information transmission apparatus such as facsimile transmission apparatus and the like.

BACKGROUND OF THE INVENTION

In the image information transmission apparatus such as facsimile transmission apparatus and the like, it has been the common practice to use a motor driven scanning element S for scanning a subject matter P to be transmitted through a line-circle conversion type optical fiber head H at a transmitter side as shown in FIG. 1 and a motor driven scanning element S for scanning a record sheet R through a multistylus head H at a receiver side as shown in FIG. 2. In this kind of image information transmission apparatus, there is a risk of the image being subjected to jitter by variation in speed of the motor M for driving the scanning elements S. In order to prevent the occurrence of such jitter, provision must be made of a multipolar motor having a sufficient margin for electric power and hence provision must be made of a special electric source.

The prior art technique of eliminating the influence of jitter upon the image information will now be described.

If the scanning element driving motor becomes irregular in rotation, it is impossible to know what number of the picture element bits from the left end of the picture surface is scanned by the scanning element. In order to know such picture element bit position, a clock pulse must be generated in correspondence with each picture element bit, the clock pulse being graduated in scale by angles which correspond to the rotary angles of the scanning element driving motor.

As means for generating such clock pulse, use may be made of a shaft encoder or a rotary encoder connected to the scanning element driving motor.

As seen from the above, if the image information is transmitted in parallel with the clock pulse, the influence of the jitter caused by the irregular rotation of the scanning element driving motor can be eliminated. Such parallel transmission of the image information and the clock pulse, however, is not compatible with the existing transmitter and receiver sets. In order to make the parallel transmission of the image information and the clock pulse compatible with the existing transmitter and receiver sets, provision must be made of means of making the intervals between the successive picture element bits of the image information, which correspond to the clock pulses whose intervals are different from each other, equal with each other, that is, provision must be made of means of making the intervals between the successive picture element bits of the image information correspondent to the clock pulses whose intervals are equal with each other. The use of the measures described ensures reception of the image information in the same manner as the process heretofore proposed.

As a result, provision must be made of means for correcting the signals whose intervals are different from each other to the signals whose intervals are equal with each other. For this purpose, the picture element bit signals whose intervals are different from each other are stored in a buffer memory and then these signals thus stored are read out by the clock pulses whose intervals are equal with each other so as to attain the above described purpose.

In FIG. 3 are shown graphs which illustrate the relation between the rotary angle of te motor for driving the scanning element for the optical fiber head at the transmitter side or the rotary angle of the motor for driving the scanning element for the multistylus head at the receiver side and the number of picture element bit. The above relation should preferably be straight line as shown by broken lines in FIG. 3. But, in practice the relation becomes non-rectilinear curve as shown by a full line curve in FIG. 3 owing to the irregular rotation of the scanning element driving motor. The shape of this curve becomes changeable in dependence not only with the number of poles of the motor, frequency of the electric source, stability of the voltage and the like but also with the load conditions. As shown in FIG. 3, let the maximum deviation of the curve from the ideal straight line be $\Delta N$ bits, provision must be made of a buffer memory which can store n bits which are a little larger in number if compared with the maximum deviation $\Delta N$, but are much smaller in number if compared with the total number of bits in one line N. That is, the relation given by $$\Delta N < n << N$$

must be satisfied.

SUMMARY OF THE INVENTION

An object of the invention is to provide an image information transfer device which is applicable to an image information transmission apparatus which makes use of a scanning element driving motor available in market and supplied from a commercial electric source.

Another object of the invention is to provide an image information transfer device which makes use of a digital circuit with which the jitter caused by the irregular rotation of the scanning element driving motor can be eliminated without providing a special electric source.

A feature of the invention is the provision of an image information transfer device comprising two kinds of shift registers capable of transferring an information at any digit to an adjoining more significant digit and composed of a first shift register for transferring a first information row and a second shift register for transferring a second information row, and a control part for delivering an instruction to transfer information by means of an output information from each digit of said second shift register, said first information row being a high frequency band signal information such as an image signal, said second information row being an information representing whether or not each information of said first information row is required to be transferred, whereby an information required to be transferred is transferred from a less significant digit to a more significant digit in succession and stored between the most significant digit and the least significant digit without forming any vacancy therebetween such that both said informations of said first and second information rows are written into the least significant digit of each of said shift registers and each information is read out from the most significant digit of each of said shift registers in succession, if necessary.

Another feature of the invention is the provision of the above described device comprising a plurality of information transfer unit circuits connected in cascade, each of said information transfer unit circuits comprising a set of information memories composed of a first information memory capable of writing in a first information by means of a write-in instruction pulse or erasing said first information by means of an erase instruction pulse and a second information memory capable of writing in or erasing a second information at the same time as said write-in or erasion effected by said first information memory, and a gate circuit adapted to be operated upon receipt of a clock pulse to deliver a write-in instruction to said set of information memories when said second information memory is at its first condition and deliver an erase instruction to another set of information memories which are the same as said one set of information memories when said second information memory is changed over from said first condition to a second condition.

A further feature of the invention is the provision of the above described image information transfer device comprising a plurality of information transfer unit circuits connected in cascade, each of said information transfer unit circuits comprising a set of information memories composed of a first information memory capable of writing in and transferring a first information by means of a transfer instruction pulse and a second information memory capable of writing in and transfer a second information at the same time as said write-in and transfer effected by said first information memory, an OR circuit capable of detecting a first condition of said second information memory or a first condition of a second information memory of another set of information memories which are the same as said set of information memories and delivering an output, and an AND circuit capable of passing and controlling a clock pulse by means of the output from said OR circuit and delivering a transfer instruction to said set of information memories.

BRIEF DESCRIPTION OF THE DRAWINGS

The invention will now be described in greater detail with reference to the accompanying drawings, wherein:

FIG. 1 is a simplified perspective view showing a transmitter side of an image information transmission apparatus;

FIG. 2 shows similarly to FIG. 1 a simplified perspective view of a receiver side of the image information transmission apparatus;

FIG. 3 is graphs which illustrate the relation between the number of picture element bits and the rotary angle of the scanning element driving motor;

FIG. 4 is a block diagram illustrating the principle of one embodiment of the image transfer device according to the invention;

FIG. 5, comprised of A-F, is a simplified illustration of the successive operations of a dual-four bits type shift register that is used in explaining the operating principle of the image transfer device according to the invention;

FIGS. 6 and 7 are detailed illustrations of two embodiments of the electrical circuit that may be employed to practice the image transfer device according to the invention; and FIGS. 8 and 9 are partial electrical circuit diagrams showing modified first stages of the circuits shown in FIGS. 6 and 7, respectively.

DETAILED DESCRIPTION

Figure 7:
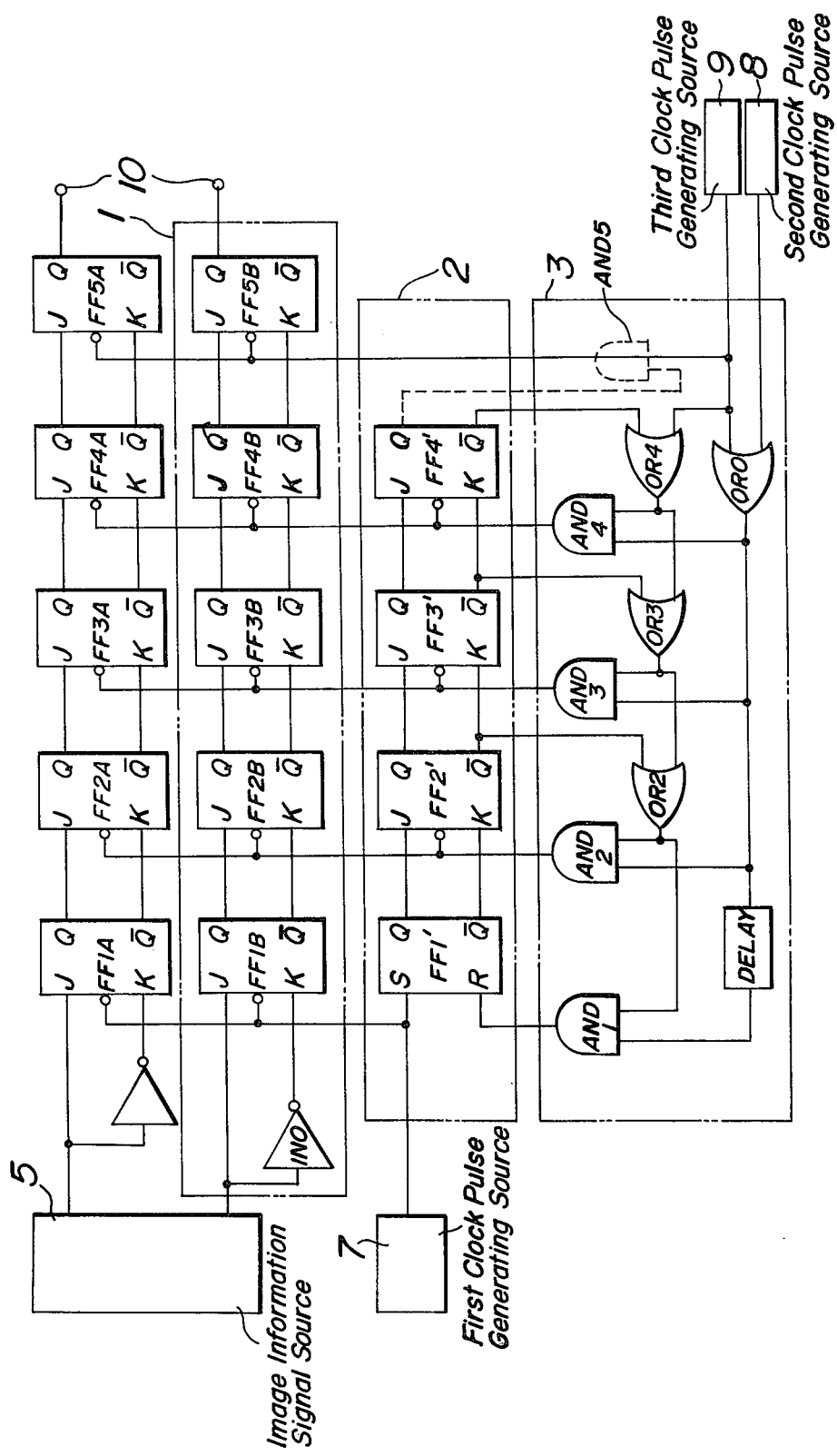

Referring to FIG. 4, component 1 is a picture image buffer memory shift register, component 2 is a memory for memorizing what number of digits of the shift register 1 is stored, that is, a shift register for transferring a second information row, component 3 is a control part for delivering an information transfer instruction by means of an output information from each digit of the second shift register, component 4 is a head such as an optical fiber head or multistylus head shown in F JS. 1 and 2, respectively, and the like, component 5 is its image information signal source, component 6 is an image information signal cable, component 7 is a first clock pulse generating source, component 8 is a second clock pulse generating source, component 9 is a third clock pulse generating source, and component 10 is an output terminal.

The control part 3 transfers the image information to the right end of the shift register 1 in response to the output from the shift register 2 and controls the shift register 1 such that the shift register 1 is always vacant at its left end and ready to receive the next succeeding image information. This control operation is effected in synchronism with the second clock pulse which is faster than the first clock pulse. The third clock pulse is a read out pulse having a constant period and serves to advance the shift register 1 in synchronism therewith to shift the image information to the output terminal 10 so as to obtain an image information without jitter.

The principle of the operation of the image information transfer device according to the invention will now be described in greater detail with reference to FIG. 5 which shows one embodiment of the invention which makes use of a dual-four bits type shift register. The shift register 1 memorizes the image information, while the shift register 2 memorizes that position of the shift register 1 which has stored the image information. In the shift register 1, the image information "0" is stored by the most significant digit at the right end. FFO shows a flip-flop circuit for holding the output image information until the next succeeding bit arrives at it. In the case shown in FIG. 5, the image information "1" is held by the FFO. The image information 6 and first clock pulse from the head 4 shown in FIG. 4 are delivered to the left ends of both the shift registers 1, 2 as shown in FIG. 5B. In the shift register 2, if a flipflop circuit under "0" condition is present, the condition "1" of a flipflop located at the left and adjoining thereto is transferred to right in succession by means of the second clock pulse. That is, the condition shown in FIG. 5B is transferred through the condition shown in FIG. 5C to the condition shown in FIG. 5D. The reading out is effected by the third clock pulse. In the present embodiment, the image information "0" is transferred to the flipflop circuit FFO as shown in FIG. 5E. At the same time, the right end flipflop of the shift register is reset from "1" to "0". As a result, the second clock pulse causes the condition of the flipflop shown in FIG. 5E to transfer to the condition of the flipflop shown in FIG. 5F. The condition of the flipflop shown in FIG. 5F is maintained until the input or output of the next succeeding image information arrives at it. Then, the operations similar to those described above will be repeated.

As seen from the above, if the first clock pulses arrived at the shift register 2 are irregular in periods owing to the irregular rotations of the scanning element driving motor, the flipflop at the left end of each shift register must always be vacant. For this purpose, the interval between the successive second clock pulses must sufficiently be narrower than the minimum interval between the successive first clock pulses. In addition, the frequency of the third clock pulse must be equal to the average frequency of the first clock pulse. If the frequency of the third clock pulse is lower than the average frequency of the first clock pulse, the shift register operative as a buffer memory becomes overflown with the image informations which are overlapped with each other, thus loosing the image information to be transferred. If the frequency of the third clock pulse is higher than the average frequency of the first clock pulse, the buffer memory becomes underflown with the image informations to interrupt the image informations to be transferred.

In FIG. 6 is shown one embodiment of the invention which can operate the dual-four bit shift register in a manner described with reference to FIG. 5.

As seen from FIG. 6, all of the shift register 1, 2 and the control gate 3 are the same in construction for each digit so that any number of stages may be connected in cascade.

In FIG. 6, the condition (Q output) of each flipflop circuit FF is shown by the condition diagram shown in FIG. 5. At first, in the condition shown in FIG. 5A, if the image information "1" and the first clock pulse are applied to the input terminals, since the $\overline{Q}$ output from the flipflop circuit FF1' is the input of an AND gate circuit AND1, the value "1" of the input J is transferred to both Q outputs of the flipflop circuits FF1, FF1' to bring these flipflop circuits FF1, FF1' into the condition shown in FIG. 5B. Then, the $\overline{Q}$ output from the flipflop circuit FF1' becomes "0" to close the gate circuit AND1 thus rejecting the first clock pulse. Then, if the second clock pulse whose period is sufficiently shorter than the period of the first clock pulse is arrived at the control part 3, since both two gate inputs to a gate circuit AND2, that is, both the Q output from the flipflop circuit FF1' and the $\overline{Q}$ output from the flipflop circuit FF2' are "1", the Q output from both the flipflop circuits FF1, FF1' are transferred to the Q outputs of the flipflop circuits FF2 and FF2', respectively. The $\overline{Q}$ output from the flipflop circuit FF2' is changed from "1" to "0" and this output is applied through a differential circuit consisting of $C_1$, $R_1$ to the clear terminals of the flipflop circuits FF1 and FF1' to clear these flipflop circuits. As a result both flipflop circuits FF1 and FF1' are brought into the condition shown in FIG. 5C. Similarly, the next succeeding second clock pulse causes condition of each flipflop circuit FF to bring into the condition shown in FIG. 5D. As a result, the image information is stored at the output side of the shift register.

Next, if the third clock pulse which is the readout pulse having the constant period arrives at the control part 3, the output from the flipflop circuit FF4 is transferred to the flipflop circuit FF5 whose output is held until the next succeeding third clock pulse arrives at the control part 3. The rear edge of the third clock pulse is differentiated by $C_4$, $R_4$ and then applied to the clear terminals of the flipflop circuits FF4 and FF4' which are then cleared and brought into the condition shown in FIG. 5E. Then, both the Q output from the flipflop circuit FF3' and the Q output from the flipflop circuit FF4' become 1 so that the next succeeding second clock pulse causes a transfer from the condition shown in FIG. 5E to the condition shown in FIG. 5F.

The above-described operation permits transferring the input image information data by every one clock pulse only when the next succeeding flipflop is vacant or only when FFn' is 1. In addition, in the above described embodiment, the image information to be transferred is of a digital signal such as a facsimile signal which does not require a half tone. In this case, the image information may be treated as signals of information row of one bit. But, even in case of phototelegraphy which requires the half tone, the image information may be treated with the digital signal. In this case, the image information becomes a row of informations of parallel multibits. In general, the use of m bits renders it possible to treat $2^m$ tones. The invention may also be applied to such case where m bit digital informations are to be transferred.

In FIG. 7 is shown another embodiment of the invention which can transfer all of the image informations which have simultaneously been read out at a high speed even when the vacant flipflop is separated from the flipflop to be transferred and which can transfer the multibit parallel information rows.

FIG. 7 shows an embodiment of the high speed 2 bits parallel image information transfer device which can effect the simultaneous parallel transfer operation. Similar to the embodiment shown in FIG. 6, the device shown in FIG. 7 comprises digit stages each of which is the same in construction so that any desired stages may be connected in cascade. As a result, the embodiment shown in FIG. 7 is simple in construction even if the operation thereof is of high speed.

Referring to FIG. 7, reference numeral 5 designates an image information generating source, 7 a first clock pulse generating source, 8 a second clock pulse generating source, and 9 a third clock pulse generating source. Flipflop circuits FF1A, FF1B, FF1' belonging to the 1st digit stage will operate in the same manner as in the case of the embodiment shown in FIG. 6. That is, the first clock pulse causes the image information to be read out to make the Q output from the flipflop circuits FF1A, FF1B 0 or 1 in response to the image information thus read out and make the Q output from the flipflop circuit FF1' 1. In the flipflop circuits FF2A, FF2B, FF2', if the second clock pulse arrives through OR0 at AND2, and if either Q of the output stage FF3' or Q of the output stage FF4' following the flipflop circuit FF2' becomes vacant or 1, the output from AND2 becomes 1, and as a result, all of the Q outputs from the flipflop circuits FF1A, FF1B, FF1' are transferred to the flipflop circuits FF2A, FF2B, FF2', respectively. In this case, let the Q output from the flipflop circuit FF4' be 0, that is, the $\overline{Q}$ output therefrom be 1, since all of the outputs from the gate circuits OR2 to OR4 are 1, the second clock pulse causes all of the image informations of the 1st to 3rd digit stages to be simultaneously shifted in parallel by one stage to the right 2nd to 4th digit stages, respectively. The reading out is effected by the third clock pulse which is applied through the gate circuits OR0, OR4 to all stages which are shifted to the output side by one stage. As a result, the circuit shown in FIG. 7 ensures a speed which is higher than that of the circuit shown in FIG. 6 and provides the important advantage that the circuit of the second clock pulse generating source 8 can be made lower in speed and that the extra number of bits required for the transfer time can be reduced. In the embodiment shown in FIG. 7, the flipflop circuits FF1A and FF1B are not reset by the second clock pulse so that the preceding informations are remained therein, while the flipflop circuit FF1' is reset by the second clock pulse. With regard to the image informations, the flipflop circuit FF1' is so designed that its Q output becomes 1 so that the flipflop circuit FF1' thus reset is left as it is. In FIG. 7, DELAY designates a delay circuit which can reset the flipflop circuit FF1' after the transfer has been effected by the third clock pulse. In the present embodiment, the third clock pulse is directly supplied to the flipflop circuits FF5A, FF5B. Alternatively, the third clock pulse may be supplied through an AND gate AND5 to the flipflop circuits FF5A, FF5B. In this case, the Q output from the flipflop circuit FF4' may be supplied to the other input terminal of the AND gate AND5 as shown by dotted lines.

In the foregoing, the image information transfer device according to the invention has been applied to the transmitter shown in FIG. 1, but it may similarly be applied to the receiver shown in FIG. 2 so as to eliminate the jitter caused by the irregular rotation of the motor M. In this case, as the first clock pulse use may be made of a pulse row having a constant period corresponding to a picture element of the image information so as to effect reading out and as the reading out third clock pulse use may be made of a pulse row delivered from a scanning position detecting device such as a rotary encoder directly connected to multistylus scanning element. The second clock pulse may be of a pulse row having a speed which is sufficiently higher than that of the first clock pulse or the third clock pulse. The device according to the invention may also be applied to the transfer of an analog image signal. In this case, the use may be made of an electric charge transfer device such as a charge coupled device (CCD) or a bucket brigade device (BBD) in the buffer memory part of the image information. The use of such measures permits of treating an analog signal, that is, an image information signal having a half tone instead of the binary signal such as the above described digital pulse.

In the circuits shown in FIGS. 6 and 7, if a number of stages are connected in cascade, fan out must be taken into consideration. But, the number of the stages shown in FIGS. 6 and 7 does not cause any trouble with respect to the fan out.

In FIG. 8 is shown one of the stages shown in FIG. 6 and adapted to be used in practice. This circuit is so designed that it operates on the basis of the negative logic function. In order to decrease the number of connection lines for input and output terminals, provision is made of two inverters 1N1, 1N2 connected to the J terminals of the JK flipflops FFn, FFn', respectively, and two inverters 1N3, 1N4 connected to the clock pulse input and output lines. These measures are not provided for the circuit shown in FIG. 6. The same measures may be applied to one stage of the circuit shown in FIG. 7.

The first stage of the circuit shown in FIG. 7 is different in construction from the other stages. In FIG. 9 is shown one stage with which all of the stages of the circuit shown in FIG. 7 can be made equal in construction with each other. In FIG. 9, P.S. designates a pulse stretcher for widening the width of an input pulse. If the first clock pulse is applied to the pulse stretcher P.S., 1 is read out from the Q output from the flipflop circuit FF1'. If the second clock pulse from the output of the OR1 circuit or the third clock pulse arrives at the flipflop circuit FF1', whose Q output becomes 0.

What is claimed is:

1. An image information transfer device comprising:
    first means comprising a shift register 1 including a plurality of stages arranged in sequential order for memorizing input image information data;
    second means comprising a shift register 2 having a plurality of stages which are the same in number as said stages of said first means and are arranged in sequential order for memorizing data representing a memorized condition in each stage of said first means;
    means for causing the first of said stages of said second means to memorize data representing that data is present in a first of the stages of said first means when said input image information data is memorized in said first stage of said first means and memorize data representing that said input image information data is absent in said first stage of said first means when said input image information data is not memorized in said first stage of said first means (first clock pulse generating source 7, AND1 and connections);
    comparing means for periodically comparing data representing a memorized condition of a given stage of said second means with data representing a memorized condition of a stage arranged next to said given stage (AND2, AND3, AND4... and connections);
    means for transferring input image information data memorized at that stage of said first means which corresponds to said given stage of said second means to a stage next to that stage of said first means when said comparing means detects that said data representing said memorized condition of said stage arranged next to said given stage of said second means represents that data is absent and simultaneously transferring said data representing said memorized condition of said given stage of said second means to said stage arranged next to said given stage (second clock pulse generating source 8, AND2, AND3, AND4 and connections); and
    means for reading out an input image information data memorized at the final stage of said first means when data representing a memorized condition in the final stage of said second means is data representing that a data is present in the final stage (third clock pulse generating source 9, AND5, FF5 and connections).

2. An image information transfer device as claimed in claim 1, said device further comprising a plurality of information transfer unit circuits connected in cascade, each of said information transfer unit circuits comprising a set of information memories composed of a first information memory capable of writing in a first information by means of a write-in instruction pulse or erasing said first information by means of an erase instruction pulse and a second information memory capable of writing in or erasing a second information at the same time as said write-in or erasure effected by said first information memory, and a gate circuit adapted to be operated upon receipt of a clock pulse to deliver a write-in instruction to said set of information memories when said second information memory is at its first condition and deliver an erase instruction to another set of information memories which are the same as said one set of information memories when said second information memory is changed over from said first condition to a second condition.

3. An image information transfer device as claimed in claim 1, said device further comprising a plurality of information transfer unit circuits connected in cascade, each of said information transfer unit circuits comprising a set of information memories composed of a first information memory capable of writing in and transferring first information by means of a transfer instruction pulse and a second information memory capable of writing in and transfering second information at the same time as said write-in and transfer effected by said first information memory, an OR circuit capable of detecting a first condition of said second information memory or a first condition of a second information memory of another set of information memories which are the same as said set of information memories and delivering an output, and an AND circuit capable of passing and controlling a clock pulse by means of the output from said OR circuit and delivering a transfer instruction to said set of informations memories.

* * * * *